(12) United States Patent
Wang et al.

(10) Patent No.: US 12,294,953 B2
(45) Date of Patent: May 6, 2025

(54) SIGNAL TRANSMITTING CIRCUIT, SIGNAL RECEIVING CIRCUIT, AND PORTABLE MONITORING DEVICE

(71) Applicant: SHENZHEN MINDRAY BIO-MEDICAL ELECTRONICS CO., LTD., Shenzhen (CN)

(72) Inventors: Heng Wang, Shenzhen (CN); Changgen Chen, Shenzhen (CN); Wenbin Wu, Shenzhen (CN); Xiangjia Li, Shenzhen (CN); Bin Liu, Shenzhen (CN)

(73) Assignee: SHENZHEN MINDRAY BIO-MEDICAL ELECTRONICS CO., LTD., Shenzhen (CN)

( * ) Notice: Subject to any disclaimer, the term of this patent is extended or adjusted under 35 U.S.C. 154(b) by 351 days.

(21) Appl. No.: 17/854,057

(22) Filed: Jun. 30, 2022

(65) Prior Publication Data
US 2022/0338131 A1 Oct. 20, 2022

Related U.S. Application Data

(63) Continuation of application No. PCT/CN2019/130852, filed on Dec. 31, 2019.

(51) Int. Cl.
*H04W 52/24* (2009.01)
*H04B 1/40* (2015.01)
*H04L 27/06* (2006.01)

(52) U.S. Cl.
CPC ............ *H04W 52/243* (2013.01); *H04B 1/40* (2013.01); *H04L 27/06* (2013.01)

(58) Field of Classification Search
CPC ...... H04W 52/243; H04W 52/28; H04B 1/40; H04L 27/06; H04L 1/00; Y02D 30/70
See application file for complete search history.

(56) References Cited

U.S. PATENT DOCUMENTS 7,558,556 B1   7/2009   Moloudi et al.
9,943,229 B1 *  4/2018   Wik ..................... A61B 5/0024
(Continued)

FOREIGN PATENT DOCUMENTS

CN   102045133 A   5/2011
CN   104081661 A   10/2014
(Continued)

OTHER PUBLICATIONS

International Search Report issued in corresponding International Application No. PCT/CN2019/130852, mailed Sep. 27, 2020, 4 pages.
(Continued)

*Primary Examiner* — Dominic E Rego
(74) *Attorney, Agent, or Firm* — BAYES PLLC

(57) ABSTRACT

A portable monitoring device, including a housing, a physiological parameter acquiring circuit, a signal transmitting circuit, and a signal receiving circuit, is provided. The physiological parameter acquiring circuit is configured to acquire physiological sign parameters of a monitoring object; the signal transmitting circuit is configured to determine a transmitting frequency of a communication signal according to the current communication state, and transmit the physiological sign parameters to a wireless access point by means of the communication signal of the transmitting frequency; the signal receiving circuit is configured to receive the communication signal transmitted by the wireless access point, and perform filter processing on the communication signal of the current communication channel to suppress interference signals from other communication signals.

10 Claims, 6 Drawing Sheets

(56) References Cited

U.S. PATENT DOCUMENTS

| | | | |
|---|---|---|---|
| 10,206,570 B2* | 2/2019 | McKenna | A61B 5/0002 |
| 10,383,527 B2* | 8/2019 | Al-Ali | A61B 5/1121 |
| 2005/0103340 A1* | 5/2005 | Wondka | A61M 16/021 128/204.18 |
| 2007/0064843 A1 | 3/2007 | Vavelidis | |
| 2013/0216012 A1* | 8/2013 | Weinholt | H04L 7/0016 375/347 |
| 2017/0000346 A1* | 1/2017 | Duckert | H04B 5/24 |
| 2018/0007639 A1* | 1/2018 | Grubis | H04W 52/0251 |
| 2018/0247712 A1* | 8/2018 | Muhsin | G08B 21/02 |
| 2019/0349652 A1* | 11/2019 | Greenewald | A61B 5/6831 |
| 2019/0374713 A1* | 12/2019 | Kiani | A61M 5/1723 |
| 2020/0121986 A1* | 4/2020 | Morris | A63B 24/0062 |
| 2020/0178903 A1* | 6/2020 | Chaudhuri | A61B 5/7445 |
| 2020/0305760 A1* | 10/2020 | Naser | A61B 5/0878 |

FOREIGN PATENT DOCUMENTS

| | | |
|---|---|---|
| CN | 104301982 A | 1/2015 |
| CN | 106850083 A | 6/2017 |
| CN | 207819906 U | 9/2018 |
| KR | 20030031294 A | 4/2003 |

OTHER PUBLICATIONS

First Office Action issued in related Chinese Application No. 201980098379.5, mailed Jun. 30, 2023, 6 pages.

\* cited by examiner

SIGNAL TRANSMITTING CIRCUIT, SIGNAL RECEIVING CIRCUIT, AND PORTABLE MONITORING DEVICE

CROSS REFERENCE TO RELATED APPLICATIONS

This application is a continuation of Patent Cooperation Treaty Application No. PCT/CN2019/130852, filed on Dec. 31, 2019, which is hereby incorporated by reference in its entirety.

TECHNICAL FIELD

The disclosure relates to the technical field of medical devices, and more particularly to a signal transmitting circuit, a signal receiving circuit, and a portable monitoring device.

BACKGROUND

In the medical field, real-time monitoring of patients can be realized through a telemetry system. As shown in FIG. 1, the telemetry system includes a portable monitoring device, an access point (AP) and a remote monitoring center. Portable monitoring device can also be called as a telemetry box, which is worn by the patient object and can acquire the physiological parameters of the monitored object in real time. The portable monitoring device transmits the acquired physiological parameters to the remote monitoring center through the wireless access point for data processing. In addition, the remote monitoring center can also transmit control instructions to the portable monitoring device through the wireless access point to control the parameter acquisition process of the portable monitoring device.

It should be noted that there may be interference in the communication process between the portable monitoring device and the wireless access point. Specifically, the two devices use the spectrum resources of the dedicated medical frequency band for communication, however the spectrum resources are limited. In some cases, the number of patients, as well as the number of the portable monitoring devices, is large. When a certain portable monitoring device communicates with the wireless access point, it may be interfered by the communication signals of other portable monitoring devices.

SUMMARY

In this regard, the present disclosure provides a signal transmitting circuit, a signal receiving circuit, and a portable monitoring device.

In a first aspect, the present disclosure provides a signal transmitting circuit, which includes a processor, a wireless chip module, an amplifying and filtering circuit and an antenna, which are electrically connected sequentially; wherein
 the processor is configured to determine a current communication state between the antenna and a wireless access point, determine a current transmission power which corresponds to the current communication state, generate a signal generation instruction according to the current transmission power, and transmit the signal generation instruction to the wireless chip module;
 the wireless chip module is configured to control a power register to generate a communication signal of the current transmission power based on an indication of the signal generation instruction, and transmit the communication signal to the amplifying and filtering circuit;
 the amplifying and filtering circuit is configured to amplify and filter the communication signal, and transmit the processed communication signal to the antenna;
 the antenna is configured to transmit the processed communication signal to the wireless access point.

In a second aspect, the present disclosure provides a signal transmitting circuit, which includes a processor, a wireless chip module, an attenuator, an amplifying and filtering circuit and an antenna, which are electrically connected sequentially; wherein
 the processor is configured to determine a current communication state between the antenna and a wireless access point, determine a current adjustment power which corresponds to the current communication state, generate a power adjustment instruction according to the current adjustment power, and transmit the power adjustment instruction to the attenuator;
 the wireless chip module is configured to generate a communication signal of a preset transmission power and transmit the communication signal to the attenuator;
 the attenuator is configured to adjust a transmission power of the communication signal according to the current adjustment power, based on an indication of the power adjustment instruction, and transmit the adjusted communication signal to the amplifying and filtering circuit;
 the amplifying and filtering circuit is configured to amplify and filter the adjusted communication signal and transmit the amplified and filtered communication signal to the antenna;
 the antenna is configured to transmit the amplified and filtered communication signal to the wireless access point.

In a third aspect, the present disclosure provides a signal transmitting circuit, which includes a processor, a wireless chip module, an attenuator, an amplifying and filtering circuit and an antenna, which are electrically connected sequentially, wherein the attenuator is electrically connected with the processor; wherein
 the processor is configured to determine a current communication state between the antenna and a wireless access point, determine a current transmission power and a current adjustment power which correspond to the current communication state, generate a signal generation instruction according to the current transmission power and transmit the signal generation instruction to the wireless chip module, and generate a power adjustment instruction according to the current adjustment power and transmit the power adjustment instruction to the attenuator;
 the wireless chip module is configured to control a power register to generate a communication signal of the current transmission power based on an indication of the signal generation instruction, and transmit the communication signal to the attenuator;
 the attenuator is configured to adjust a transmission power of the communication signal according to the current adjustment power, based on an indication of the power adjustment instruction, and transmit the adjusted communication signal to the amplifying and filtering circuit;

the amplifying and filtering circuit is configured to amplify and filter the adjusted communication signal and transmit the amplified and filtered communication signal to the antenna;

the antenna is configured to transmit the amplified and filtered communication signal to the wireless access point.

In a fourth aspect, the present disclosure provides a signal transmitting circuit, which includes a processor, a baseband chip, a local oscillation chip, a first switch, a mixing and filtering circuit, an attenuator, a first amplifying and filtering circuit, a second amplifying and filtering circuit, a second switch and an antenna;

wherein the processor, the baseband chip and a first input terminal of the mixing and filtering circuit are electrically connected; an output terminal of the mixing and filtering circuit, the attenuator and the first amplifying and filtering circuit are electrically connected sequentially; the first amplifying and filtering circuit is electrically connected with the antenna through a first switch terminal of the second switch;

the processor is electrically connected with the local oscillation chip;

the local oscillation chip is electrically connected with a second input terminal of the mixing and filtering circuit through a first switch terminal of the first switch;

the local oscillation chip is electrically connected with the second amplifying and filtering circuit through a second switch terminal of the first switch, the second amplifying and filtering circuit is electrically connected with the antenna through a second switch terminal of the second switch;

the processor is further electrically connected with the first switch and is configured to control the first switch terminal of the first switch to be connected and the second switch terminal of the first switch to be disconnected; or is configured to control the second switch terminal of the first switch to be connected and the first switch terminal of the first switch to be disconnected;

the processor is further electrically connected with the second switch and is configured to control the first switch terminal of the second switch to be connected and the second switch terminal of the second switch to be disconnected; or is configured to control the second switch terminal of the second switch to be connected and the first switch terminal of the second switch to be disconnected;

the processor is further electrically connected with the attenuator.

In a fifth aspect, the present disclosure provides a signal receiving circuit, which includes a processor, a baseband chip, a local oscillation chip, a narrowband filter, a mixing and filtering circuit, an amplifying and filtering circuit and an antenna;

wherein the antenna, the amplifying and filtering circuit and a first input terminal of the mixing and filtering circuit are electrically connected sequentially;

an output terminal of the mixing and filtering circuit, the narrowband filter, the baseband chip and the processor are electrically connected sequentially;

the processor, the local oscillation chip and a second input terminal of the mixing and filtering circuit are electrically connected sequentially;

the antenna is configured to receive a communication signal; the amplifying and filtering circuit is configured to amplify and filter the communication signal which is received by the antenna; the processor is configured to determine a current communication channel of the signal receiving circuit and control the local oscillation chip to generate a communication signal by using a frequency point which corresponds to the current communication channel; the mixing and filtering circuit is configured to mix the amplified and filtered communication signal with the communication signal which is generated by the local oscillation chip to obtain a communication signal which is to be demodulated; the narrowband filter is configured to implement a narrowband filtering to the communication signal which is to be demodulated; the baseband chip is configured to demodulate the communication signal which is to be demodulated after the narrowband filtering and to transmit the demodulated communication signal to the processor.

In a sixth aspect, the present disclosure provides a signal receiving circuit, which includes a processor, a baseband chip, an amplifier, a narrowband filter module and an antenna which are electrically connected sequentially; wherein the narrowband filter module includes one or more narrowband filters, and different narrowband filters are configured to implement a narrowband filtering to communication signals which are received from different communication channels;

the antenna is configured to receive the communication signals;

the processor is electrically connected with the narrowband filter module and is configured to determine a current communication channel of the signal receiving circuit and transmit a control instruction to the narrowband filter module to enable the narrowband filter module to implement a narrowband filtering to the communication signal which is received by the antenna by using the narrowband filter which corresponds to the current communication channel;

the amplifier is configured to amplify the communication signal after the narrowband filtering;

the baseband chip is configured to demodulate the amplified communication signal and transmit the demodulated communication signal to the processor.

In a seventh aspect, the present disclosure provides a signal receiving circuit, which includes a processor, a baseband chip, a local oscillation chip, a narrowband filter, a mixing and filtering circuit, a first amplifying and filtering circuit, a first switch, a second switch, a second amplifying and filtering circuit and an antenna;

wherein the processor, the baseband chip, the narrowband filter and an output terminal of the mixing and filtering circuit are electrically connected; a first input terminal of the mixing and filtering circuit and the first amplifying and filtering circuit are electrically connected sequentially; the first amplifying and filtering circuit is electrically connected with the antenna through a first switch terminal of the second switch;

the processor is electrically connected with the local oscillation chip;

the local oscillation chip is electrically connected with a second input terminal of the mixing and filtering circuit through a first switch terminal of the first switch; the local oscillation chip is electrically connected with the second amplifying and filtering circuit through a second switch terminal of the first switch;

the processor is further electrically connected with the first switch and is configured to control the first switch terminal of the first switch to be connected and the second switch terminal of the first switch to be disconnected; or is configured to control the second switch terminal of the first switch to be connected and the first switch terminal of the first switch to be disconnected;

the processor is further electrically connected with the second switch and is configured to control the first switch terminal of the second switch to be connected and the second switch terminal of the second switch to be disconnected; or is configured to control the second switch terminal of the second switch to be connected and the first switch terminal of the second switch to be disconnected;

the antenna is electrically connected with the first amplifying and filtering circuit through the first switch terminal of the second switch; and the antenna is further electrically connected with the second amplifying and filtering circuit through the second switch terminal of the second switch.

In an eighth aspect, the present disclosure provides a portable monitoring device, which includes a housing, a physiological parameter acquisition circuit, any above signal transmitting circuit and any above signal receiving circuit;

wherein the physiological parameter acquisition circuit is configured to acquire a physiological parameter of a monitored object;

the signal transmitting circuit is configured to transmit the physiological parameter to a wireless access point through the communication signal; and the signal receiving circuit is configured to receive the communication signal which is transmitted by the wireless access point and to filter the communication signal.

BRIEF DESCRIPTION OF THE DRAWINGS

In order to more clearly explain the embodiments of this disclosure or the technical solutions in the prior art, the following will briefly introduce the drawings which are needed to be used in the description of the embodiments or the prior art. It is obvious that the drawings in the following description are only some embodiments of this disclosure. For those skilled in the art, other drawings can be obtained from these accompanying drawings without paying any creative works.

DETAILED DESCRIPTION

In order to have a clear and complete understanding of the technical solution of this disclosure, the technical solutions in the specific embodiments of this disclosure are described in detail with reference to the accompanying drawings. Obviously, the described embodiments are only some of the embodiments of the disclosure, rather than all of them. Based on the embodiments of the disclosure, all other embodiments, which can be obtained by one skilled in the art without making creative work, belong to the protection scope of the disclosure.

Figure 1:
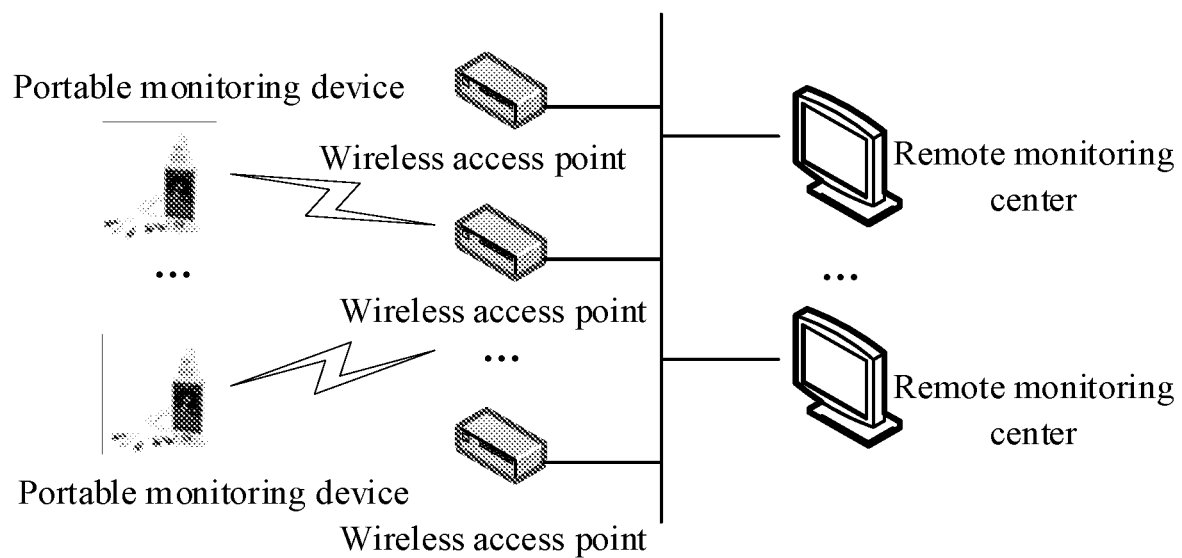
FIG. 1 is a structural diagram of a telemetry system.

In the medical field, the portable monitoring device can communicate with the wireless access point through wireless resources. For example, as shown in FIG. 1, the portable monitoring device transmits physiological parameters to the remote monitoring center through the wireless access point, or receives the control instructions which are transmitted by the remote monitoring center through the wireless access point. When the wireless resource communication is used between devices, the wireless resource frequency band needs to be occupied, including but not limited to the dedicated medical frequency band.

It can be understood that in the scenario where portable monitoring devices are densely connected to wireless access points, communication interference between portable monitoring devices is caused due to the limitation of wireless spectrum resources. One way to solve the communication interference is that the portable monitoring device adopts the communication technology of frequency hopping or time slice hopping. However, this dynamic adjustment not only affects the communication stability, but also results in the disconnection of communication as the spectrum resources and time slice resources may not be enough to support the use of the large number of portable monitoring devices and wireless access points in the dense scenes.

Figure 2:
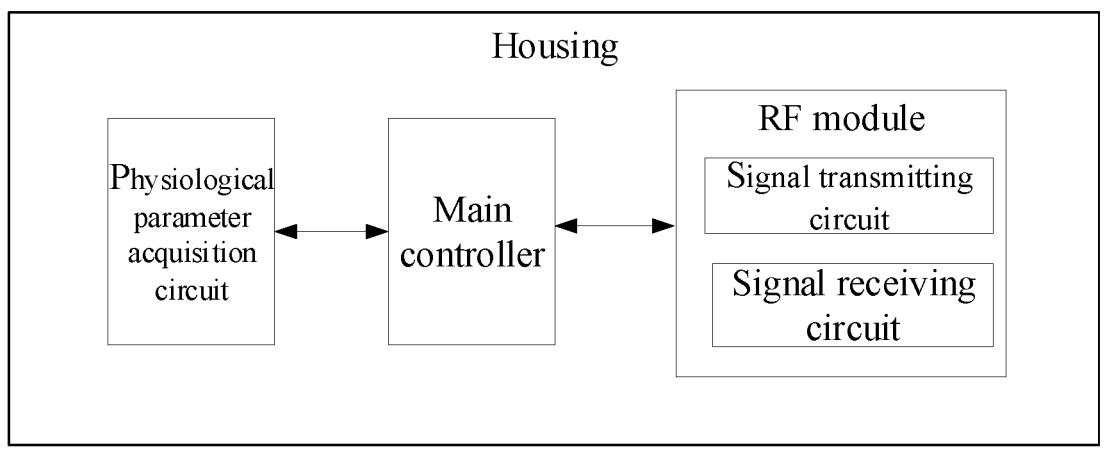
FIG. 2 is a circuit structure diagram of a portable monitoring device.

The present disclosure provides a portable monitoring device, as shown in FIG. 2. The portable monitoring device includes a housing, a physiological parameter acquisition circuit, a main controller, a signal transmitting circuit and a signal receiving circuit.

The physiological parameter acquisition circuit is configured to acquire a physiological parameter of a monitored object.

The main controller is connected with the physiological parameter acquisition circuit and a radio frequency (RF) module to forward the physiological parameter, which is acquired by the physiological parameter acquisition circuit, to the RF module. The main controller may include a processor for processing the physiological parameter, such as but not limited to the AM3358 processor.

The RF module specifically includes a signal transmitting circuit and a signal receiving circuit.

The signal transmitting circuit is configured to transmit the physiological parameter to a wireless access point through the communication signal; wherein a transmission power of the communication signal is determined by the signal transmitting circuit according to a communication state of the portable monitoring device.

The signal receiving circuit is configured to receive the communication signal, which is transmitted by the wireless access point, to filter the communication signal, and to extract communication data from the communication signal; wherein the filtering filters an interference signal of other communication channel(s), which is/are other than the communication channel, which is used by the signal receiving circuit.

It should be noted that the specific structure of the signal transmitting circuit can be any one described below, while the specific structure of the signal receiving circuit can be any one of the existing or any one described below. Alternatively, the specific structure of the signal receiving circuit may be any one described below, while the specific structure of the signal transmitting circuit may be any one of the existing or any one described below. Alternatively, the specific structure of the signal transmitting circuit may be any one described below, and the specific structure of the signal receiving circuit may be any one described below. In addition, the signal transmitting circuit and the signal receiving circuit can share circuits with the same connection structure, but the transmission directions of their communication signals are opposite. One is to generate and transmit the communication signal through the signal transmitting circuit, and the other is to receive and analyze the communication signal which is transmitted by the wireless access point through the signal receiving circuit.

Based on the above description, the portable monitoring device can adjust the power of the transmitted communication signal according to the communication state for reducing the communication interference to other portable monitoring devices; and/or can filter the signals of other communication channels other than the communication channel after receiving the communication signal, to reduce the communication interference of other portable monitoring devices to the present portable monitoring device.

The specific structures of the signal transmitting circuit and the signal receiving circuit are described below in combination with the drawings.

Figure 3:
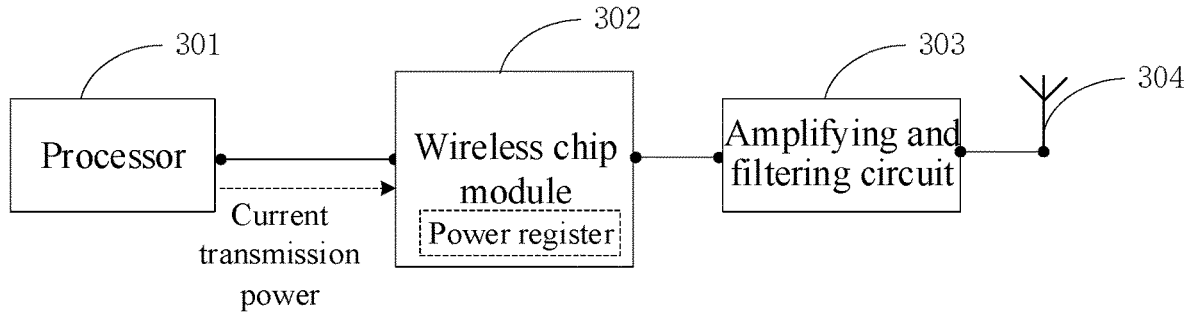
FIG. 3 is a schematic diagram showing a power adjustment implemented by a wireless chip module in a signal transmitting circuit.

Referring FIG. 3, a structural embodiment of a signal transmitting circuit is shown, which includes a processor 301, a wireless chip module 302, an amplifying and filtering circuit 303 and an antenna 304. The processor 301, the wireless chip module 302, the amplifying and filtering circuit 303 and the antenna 304 are electrically connected sequentially.

The processor 301 is configured to determine a current communication state between the antenna 304 and a wireless access point, determine a current transmission power which corresponds to the current communication state, generate a signal generation instruction according to the current transmission power, and transmit the signal generation instruction to the wireless chip module.

Specifically, the antenna of the signal transmitting circuit can transmit the communication signal to the wireless access point or receive the communication signal which is transmitted by the wireless access point. The communication states of both may be different at different time points. Therefore, the processor determines the current communication state between the antenna and the wireless access point. The communication state can be determined based on various communication parameters, including but not limited to received signal strength indication (RSSI), signal noise ratio (SNR), packet loss rate, etc.

The transmission power, which corresponds to the communication state, can be determined according to the current communication state. For convenience of description, this transmission power can be called as the current transmission power. One embodiment of the corresponding relationship of the transmission power and the communication state can be that the signal transmission power is lower when the communication state is better, and the signal transmission power is higher when the communication state is worse. In this way, on the premise of ensuring the normal communication of the device, the communication power consumption of the device and the communication interference to other devices can also be reduced.

Another embodiment of the corresponding relationship of the transmission power and the communication state can be that the corresponding relationship between the communication state and the transmission power is preset, and the current transmission power which corresponds to the current communication state is determined according to the corresponding relationship. For example, as shown in Table 1, the corresponding relationship between the transmission power level and the received signal strength indication is set through the mapping relationship table.

TABLE 1

| Transmission Power Level | RSSI |
| --- | --- |
| Level 1 | RSSI < −60 |
| Level 2 | −60 < RSSI < −50 |
| Level 3 | −50 < RSSI < −40 |
| Level 4 | RSSI > −40 |

It should be noted that the number of transmission power levels, the values of the communication parameters and transmission power levels which are shown in Table 1 are only examples, and can be set to other values according to actual requirements. In addition, the received signal strength indication (RSSI) can be replaced by other communication parameters which are monitored by the processor and can represent the communication state. The transmission power level can correspond to the specific transmission power value, so the specific signal transmission power can be determined according to the transmission power level. Alternatively, the transmission power level in Table 1 can be directly replaced by the signal transmission power value.

After determining the current transmission power, the processor 301 generates a signal generation instruction which indicates to generate signals of the current transmission power. For example, the signal generation instruction carries a specific value of the current transmission power. Then, the processor 301 transmits the signal generation instruction to the wireless chip module 302.

The wireless chip module 302 is configured to control a power register to generate a communication signal of the current transmission power based on an indication of the signal generation instruction, and transmit the communication signal to the amplifying and filtering circuit.

Specifically, the wireless chip module 302 has a power register, which can generate the communication signal of a certain transmission power. After receiving the signal generation instruction, the wireless chip module 302 controls the power register to generate the communication signal of the transmission power which is indicated by the signal generation instruction.

The amplifying and filtering circuit 303 is configured to amplify and filter the communication signal for enabling the communication signal to satisfy the transmission requirements, and transmit the processed communication signal to the antenna 304.

The antenna 304 is configured to transmit the processed communication signal to the wireless access point. For example, the transmitted communication signal may include, but is not limited to, a communication signal of 1.4 GHz frequency band or 608 MHz frequency band.

As can be seen from the above description, comparing with using a fixed signal transmission power for communication, the communication mode of adjusting the signal transmission power according to the real-time communication state can avoid unnecessary waste of power consumption and reduce the interference to other communication signals.

Figure 4:
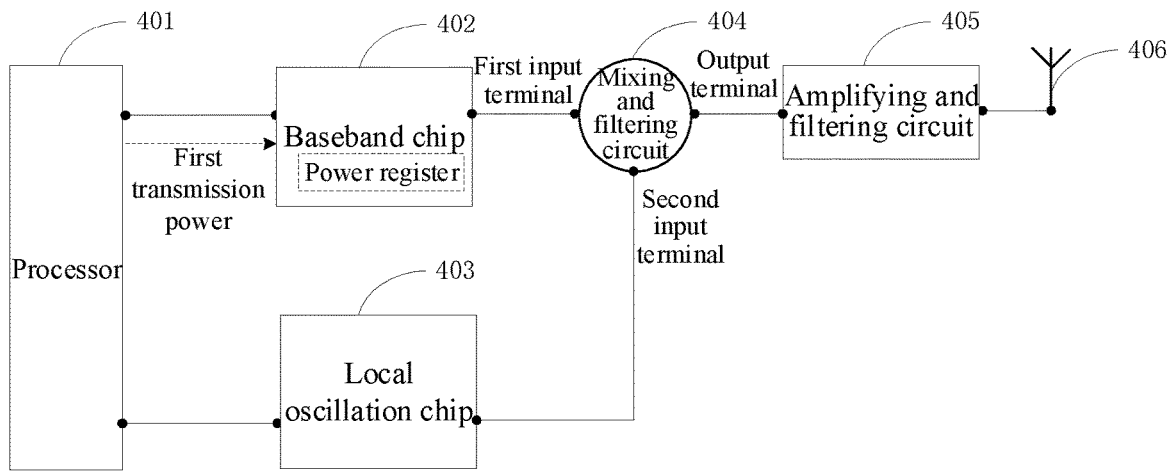
FIG. 4 is a schematic diagram showing a power adjustment implemented by a baseband chip in a signal transmitting circuit.

Referring FIG. 4, a structural embodiment of a signal transmitting circuit is shown, which includes a processor 401, a baseband chip 402, a local oscillation chip 403, a mixing and filtering circuit 404, an amplifying and filtering circuit 405 and antenna 406. The baseband chip 402 is electrically connected with the processor 401 and a first input terminal of the mixing and filtering circuit 404, respectively. The local oscillation chip 403 is electrically connected with the processor 401 and a second input terminal of the mixing and filtering circuit 404, respectively. An output terminal of the mixing and filtering circuit 404 is electrically connected with the amplifying and filtering circuit 405.

It should be noted that the functions of the baseband chip 402, the local oscillation chip 403 and the mixing and filtering circuit 404 are the same as the wireless chip module 302 in the embodiment shown in FIG. 3, that is, they are configured to obtain the communication signal of the current transmission power. Specifically, the baseband chip 402 can generate a communication signal of a certain transmission frequency, the local oscillation chip 403 can generate a communication signal of a certain transmission frequency, and the mixing and filtering circuit 404 is configured to mix the two communication signals to obtain the communication signal of the current transmission power.

The communication signal generated by the local oscillation chip 403 can be called a carrier signal, the transmission power of the carrier signal can be a certain preset transmission power, and the local oscillation chip 403 generates a carrier signal according to the preset transmission power. In order to adjust the transmission power, the transmission frequency of the communication signal which is generated by the baseband chip 402 can be controlled. The specific control mode is as follows.

The processor 401 determines the current transmission power according to the current communication state, wherein the current transmission power corresponds to the transmission power of the communication signal which should be generated by the baseband chip. For convenience of description, the transmission power can be called as a first transmission power or a baseband chip transmission power. For example, a mapping relationship table can be preset, which records the corresponding relationship among a total transmission power, the baseband chip transmission power and the communication state. Based on the mapping relationship table, the baseband chip transmission power which corresponds to the current communication state can be determined. Alternatively, the mapping relationship table records the corresponding relationship between the baseband chip transmission power and the communication state. Alternatively, the mapping relationship table records the corresponding relationship among the total transmission power, the local chip transmission power, the baseband chip transmission power and the communication state.

The processor 401 generates a signal generation instruction according to the current transmission power. The signal generation instruction can carry the first transmission power, which is configured to control the transmission power of the communication signal which is generated by the baseband chip. The processor 401 transmits a first signal generation instruction to the baseband chip 402.

The baseband chip 402 controls its power register to generate a communication signal of the first transmission power based on an indication of the first signal generation instruction. In addition, the local oscillation chip 403 generates a carrier signal of a preset transmission power. The mixing and filtering circuit 404 mixes the communication signal of the first transmission power with the carrier signal of the preset transmission power to obtain the communication signal of the current transmission power.

The communication signal of the current transmission power is amplified and filtered by the amplifying and filtering circuit 405 and transmitted to the wireless access point through the antenna 406. The transmitted communication signal includes but is not limited to the communication signal of 1.4 GHz frequency band.

In the signal transmitting circuit provided by the present embodiment, the mixing and filtering circuit 404 can generate the communication signal for transmission by using two channels of communication signals. This embodiment can avoid unnecessary waste of power consumption and reduce interference to other communication signals by adjusting the transmission power of the communication signals which are transmitted by antenna 406, through adjusting one channel of communication signals which are transmitted by baseband chip 402.

It should be noted that the number of baseband chips and local oscillation chips may not be limited to that shown in FIG. 4. In the case of including multiple baseband chips and/or multiple local oscillation chips, the communication signals which are outputted by the baseband chip and the local oscillation chip can be processed by the mixing and filtering circuit to obtain the communication signal of the transmission power which corresponds to the current communication state.

Figure 5:
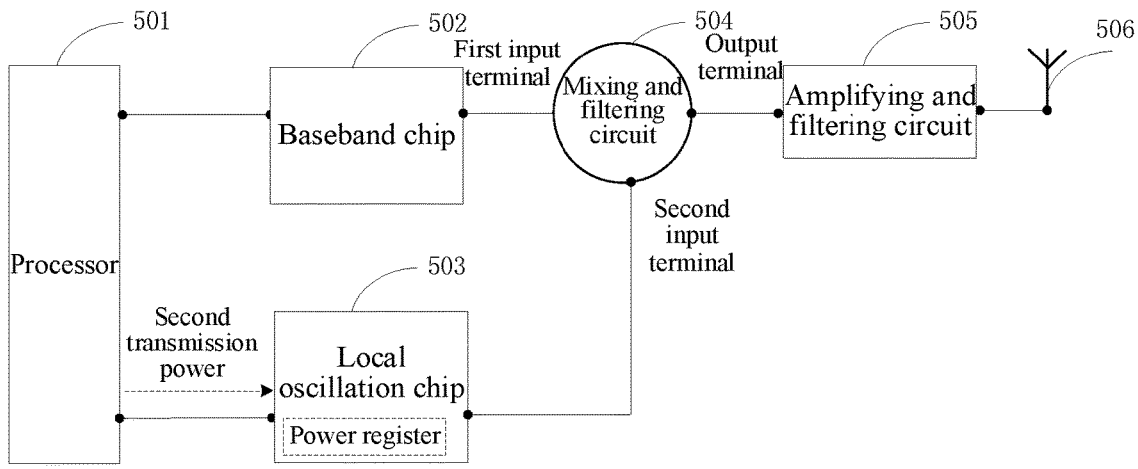
FIG. 5 is a schematic diagram showing a power adjustment implemented by a local oscillation chip in a signal transmitting circuit.

Referring FIG. 5, a further structural embodiment of a signal transmitting circuit is shown, which specifically includes a processor 501, a baseband chip 502, a local oscillation chip 503, a mixing and filtering circuit 504, an amplifying and filtering circuit 505 and an antenna 506.

It should be noted that, different from the embodiment shown in FIG. 4, in this embodiment, the processor 501 does not generate the first signal generation instruction for controlling the baseband chip, but generates a second signal generation instruction for controlling the local oscillation chip according to the current transmission power. The second signal generation instruction can carry a second transmission power which corresponds to the current communication state, and the second transmission power can also be called a local oscillation chip transmission power. How to determine the local oscillation chip transmission power by the processor can refer to the embodiment shown in FIG. 4. For example, the mapping relationship table can be preset, which records the corresponding relationship between the communication state and the local oscillation chip transmission power, and the local oscillation chip transmission power can be determined based on the mapping relationship table.

The processor 501 transmits the second signal generation instruction to the local oscillation chip 503. The local oscillation chip 503 controls its power register to generate a carrier signal of the second transmission power based on an indication of the second signal generation instruction.

The baseband chip 502 generates a communication signal of a preset transmission power.

The mixing and filtering circuit 504 mixes the communication signal of the preset transmission power with the carrier signal of the second transmission power to obtain the communication signal of the current transmission power.

The communication signal of the current transmission power is amplified and filtered by the amplifying and filtering circuit 505 and transmitted to the wireless access point through the antenna 506. The transmitted communication signal includes but is not limited to the communication signal of 1.4 GHz frequency band.

In this embodiment, the preset transmission power can be a preset fixed transmission power value. The baseband chip generates the communication signal based on the preset transmission power. When it is necessary to adjust the transmission frequency of the communication signal which is transmitted by the antenna, the transmission power of the signal which is generated by the local oscillation chip can be adjusted.

Figure 6:
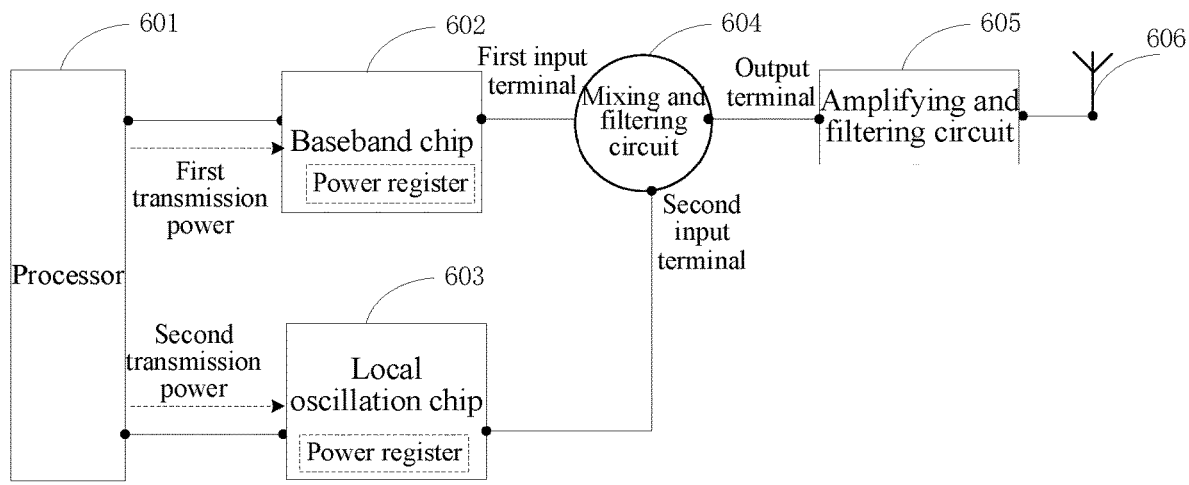
FIG. 6 is a schematic diagram showing a power adjustment implemented by a baseband chip and a local oscillation chip in a signal transmitting circuit.

Referring FIG. 6, another further structural embodiment of a signal transmitting circuit is shown, which specifically includes a processor 601, a baseband chip 602, a local oscillation chip 603, a mixing and filtering circuit 604, an amplifying and filtering circuit 605 and an antenna 606.

Different from the embodiments shown in FIG. 4 and FIG. 5, in this embodiment, the processor 601 can generate two signal generation instructions to control the transmission power of the communication signal, which is generated by the baseband chip, and the transmission power of the communication signal, which is generated by the local oscillation chip, respectively. Specifically, the processor 601 generates a first signal generation instruction which corresponds to the first transmission power and a second signal generation instruction which corresponds to the second transmission power, according to the current transmission power, wherein the first transmission power can be called as a baseband chip transmission power, and the second transmission power can be called as a local oscillation chip transmission power. The sum of the first transmission power and the second transmission power is the current transmission power. The processor 601 transmits the first signal generation instruction to the baseband chip 602 and the second signal generation instruction to the local oscillation chip 603.

How to determine the baseband chip transmission power and the local oscillation chip transmission power by the processor can refer to the embodiment shown in FIG. 4. For example, the mapping relationship table can be preset, which records the corresponding relationship among the communication state, the baseband chip transmission power and the local oscillation chip transmission power, and then the baseband chip transmission power and the local oscillation chip transmission power can be determined based on the mapping relationship table.

The baseband chip 602 controls its power register to generate the communication signal of the first transmission power based on an indication of the first signal generation instruction. The local oscillation chip 603 controls its power register to generate a carrier signal of the second transmission power based on an indication of the second signal generation instruction. The mixing and filtering circuit 604 mixes the communication signal of the first transmission power with the carrier signal of the second transmission power to obtain the communication signal of the current transmission power.

The communication signal of the current transmission power is amplified and filtered by the amplifying and filtering circuit 605 and transmitted to the wireless access point through the antenna 606. The transmitted communication signal includes but is not limited to the communication signal of 1.4 GHz frequency band.

In this embodiment, the signal transmitting circuit adjusts the transmission powers of both the baseband chip and the local oscillation chip. Through the two channel of adjustments, the power adjustment of the communication signals, which are transmitted by the antenna, is realized.

In practical application, in addition to using the power register to adjust the transmission power of the communication signal, the transmission power of the communication signal can be adjusted by controlling an attenuator. Referring FIG. 7, another further structural embodiment of a signal transmitting circuit is shown, which specifically includes a processor 701, a wireless chip module 702, an attenuator 703, an amplifying and filtering circuit 704 and an antenna 705.

The processor 701, the wireless chip module 702, the attenuator 703, the amplifying and filtering circuit 704 and the antenna 705 are electrically connected sequentially, and the processor 701 is electrically connected with the attenuator 703.

The processor 701 is configured to determine a current communication state between the antenna 705 and a wireless access point, and determine a current adjustment power which corresponds to the current communication state. One way to determine the current adjustment power is to determine the current adjustment power which corresponds to the current communication state, according to a preset corresponding relationship between the communication state and the adjustment power. Specifically, referring to the embodiment shown in FIG. 3, a mapping relationship table is set to record the corresponding relationship between the communication state and the adjustment power, and the current adjustment power which corresponds to the current communication state can be determined according to the mapping relationship table.

It should be noted that in this embodiment, the power determined by the processor 701 is the adjustment power, which is configured to adjust the transmission power of the communication signal which is generated by the previous stage circuit, such as increasing or reducing the transmission power, so as to make the adjusted transmission power satisfying the expected effect, that is, avoiding unnecessary waste of the power consumption and reducing the interference to other communication signals.

The processor 701 generates a power adjustment instruction according to the current adjustment power, and transmits the power adjustment instruction to the attenuator 703. In addition, the wireless chip module 702 generates a communication signal of a preset transmission power and transmits the communication signal to the attenuator 703.

Based on the indication of the power adjustment instruction, the attenuator 703 adjusts the transmission power of the communication signal which is generated by the wireless chip module 702 according to the current adjustment power, such as reducing or increasing a certain value.

The attenuator 703 transmits the adjusted communication signal to the amplifying and filtering circuit 704, which amplifies and filters the adjusted communication signal, and transmits the amplified and filtered communication signal to the antenna 705, and the antenna 705 transmits the amplified and filtered communication signal to the wireless access point.

It can be seen that this embodiment realizes the adjustment of the transmission power of the communication signal through the attenuator and avoids unnecessary waste of the power consumption and reduces the interference to other communication signals, on the basis of ensuring normal communication.

In one embodiment, the wireless chip module 702 may include one wireless chip. In another embodiment, the wireless chip module 702 may include a mixing and filtering circuit and a plurality of wireless chips. The mixing and filtering circuit mixes and filters the communication signals of the plurality of wireless chips to obtain the communication signal of the preset transmission power. For example, the wireless chip module 702 may specifically include a baseband chip, a local oscillation chip and a mixing and filtering circuit. Wherein, the baseband chip is electrically connected with the processor and a first input terminal of the mixing and filtering circuit, respectively. The local oscillation chip is electrically connected with the processor and a second input terminal of the mixing and filtering circuit, respectively. The output terminal of the mixing and filtering circuit is electrically connected with the attenuator.

Figure 8:
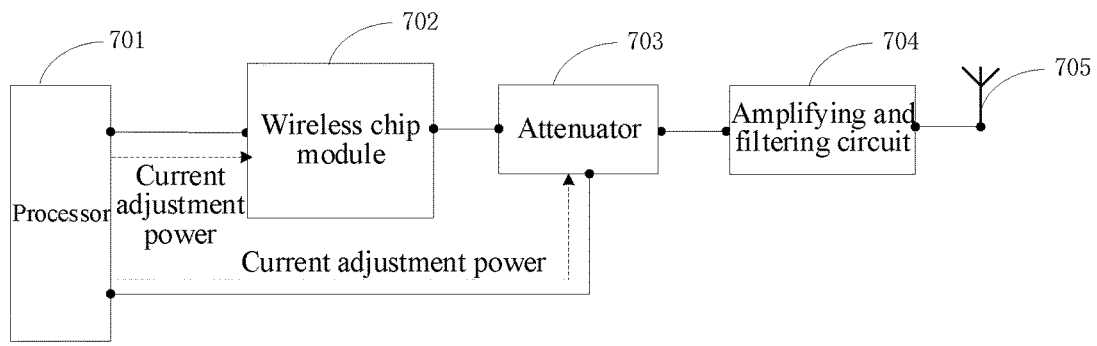
FIG. 8 is a schematic diagram showing a power adjustment implemented by a wireless chip module and an attenuator in a signal transmitting circuit.

In practical application, the transmission power of communication signal can also be adjusted by combining the transmission power adjustment manner through the power register and the transmission power adjustment manner through the attenuator. Referring FIG. 8, another structural embodiment of the signal transmitting circuit is shown, which specifically includes a processor 801, a wireless chip module 802, an attenuator 803, an amplifying and filtering circuit 804 and an antenna 805.

Figure 7:
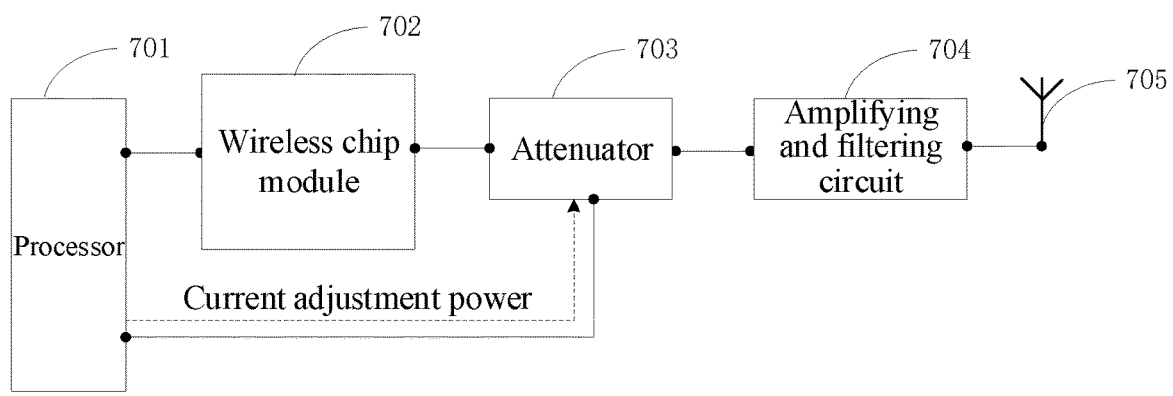
FIG. 7 is a schematic diagram showing a power adjustment implemented by an attenuator in a signal transmitting circuit.

Different from the embodiment shown in FIG. 7, the processor 801 generates two control instructions to adjust the transmission power of the communication signal, which is generated by the wireless chip module 802, and the transmission power of the communication signal, which is generated by the attenuator 803, respectively.

Specifically, the processor 801 determines a current communication state between the antenna and the wireless access point; determines a current transmission power and a current adjustment power which correspond to the current communication state. One way to determine the current transmission power and the current adjustment power is to determine the current transmission power and the current adjustment power which correspond to the current communication state according to the preset corresponding relationship between the communication state, the transmission power and the adjustment power. More specifically, for example, the current transmission power and the current adjustment power may be determined by using a preset mapping relationship table.

The processor 801 generates a signal generation instruction according to the current transmission power, and transmits the signal generation instruction to the wireless chip module 802 to indicate a communication signal of what power the wireless chip module 802 generates. The processor 801 generates a power adjustment instruction according to the current adjustment power, and transmits the power adjustment instruction to the attenuator 803 to indicate the attenuator 803 how to attenuate the communication signal which is generated by the wireless chip module 802.

In one or more embodiments, the wireless chip module 802 may specifically include a baseband chip, a local oscillation chip and a mixing and filtering circuit, so that the power adjustments of the baseband chip, the local oscillation chip and the combination of the two can implemented respectively with reference to the description of the embodiments shown in FIG. 4, FIG. 5 and FIG. 6. The specific adjustment methods can refer to the above description and is not repeated here.

Figure 9:
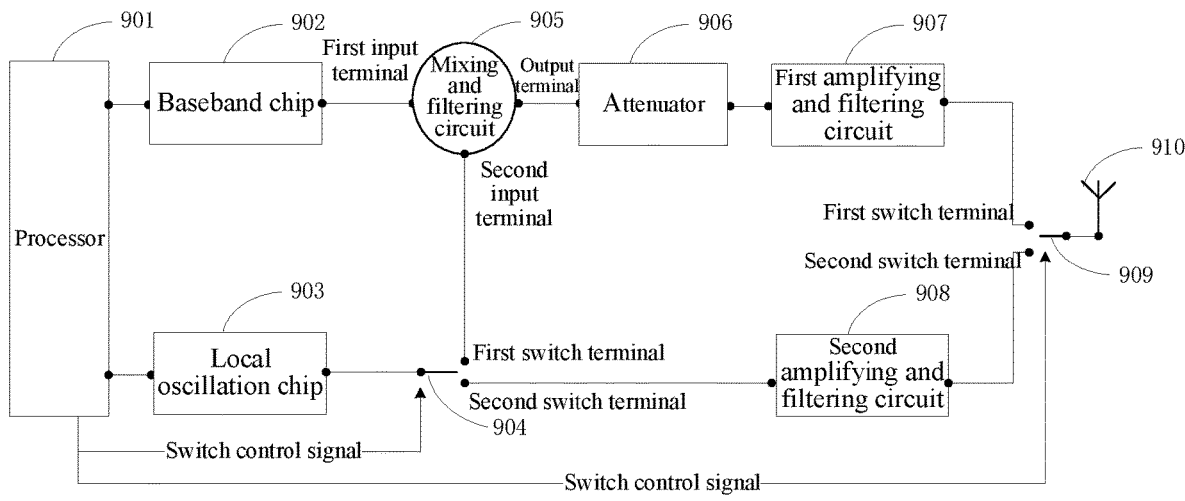
FIG. 9 is a structural diagram of a signal transmitting circuit.

Referring FIG. 9, another structural embodiment of the signal transmitting circuit is shown, which specifically includes a processor 901, a baseband chip 902, a local oscillation chip 903, a first switch 904, a mixing and filtering circuit 905, an attenuator 906, a first amplifying and filtering circuit 907, a second amplifying and filtering circuit 908, a second switch 909 and an antenna 910.

Wherein the processor 901, the baseband chip 902 and a first input terminal of the mixing and filtering circuit 905 are electrically connected; an output terminal of the mixing and filtering circuit 905, the attenuator 906 and the first amplifying and filtering circuit 907 are electrically connected sequentially; the first amplifying and filtering circuit 907 is electrically connected with the antenna 910 through a first switch terminal of the second switch 909.

The processor 901 is electrically connected with the local oscillation chip 903; the local oscillation chip 903 is electrically connected with a second input terminal of the mixing and filtering circuit 905 through a first switch terminal of the first switch 904; the local oscillation chip 903 is electrically connected with the second amplifying and filtering circuit 908 through a second switch terminal of the first switch 904; the second amplifying and filtering circuit 908 is electrically connected with the antenna 910 through a second switch terminal of the second switch 909; and the processor 901 is further electrically connected with the attenuator 906.

The processor 901 is electrically connected with the first switch 904, and the processor 901 is electrically connected with the second switch 909. Accordingly, the processor 901 can form two signal transmitting circuits with different structures by controlling the disconnection and connection of the first switch 904 and the second switch 909, specifically as follows.

In one case, the processor 901 transmits a switch signal to the first switch 904 to connect the first switch terminal of the first switch 904 and disconnect the second switch terminal of the first switch 904. Furthermore, the processor 901 transmits a switch signal to the second switch 909 to connect the first switch terminal of the second switch 909 and disconnect the second switch terminal of the second switch 909. In this way, the local oscillation chip 903 is connected with the mixing and filtering circuit 905, to transmit the communication signal for mixing to the mixing and filtering circuit 905. The mixing and filtering circuit 905 mixes the communication signal of the baseband chip 902 with the communication signal of the local oscillation chip 903, and the mixed communication signal is transmitted by the antenna 910 after being processed by the attenuator 906 and the first amplifying and filtering circuit 907.

This form of circuit structure can transmit, but is not limited to, communication signals of 1.4 GHz frequency band.

It should be noted that under this form of circuit structure, the processor adjusts the transmission power of the communication signal transmitted by the antenna by controlling any one or more of the baseband chip 902, the local oscillation chip 903 and the attenuator 906. The specific adjustment methods can refer to the above description and is not repeated here.

In another case, the processor 901 transmits a switch signal to the first switch 904 to connect the second switch terminal of the first switch 904 and disconnect the first switch terminal of the first switch 904. Furthermore, the processor 901 transmits a switch signal to the second switch 909 to connect the second switch terminal of the second switch 909 and disconnect the first switch terminal of the second switch 909. In this way, the communication signal of the local oscillation chip 903 is not subjected to mixing processing, but is transmitted by the antenna 910 after being processed by the second amplifying and filtering circuit 908.

This form of circuit structure can transmit, but is not limited to, communication signals of 608 MHz frequency band.

It should be noted that under this form of circuit structure, the processor adjusts the transmission power of the communication signal transmitted by the antenna by controlling the baseband chip 902, such as controlling the power register in the baseband chip 902. The specific adjustment process may refer to the above description and is not repeated here.

The disclosure also provides a signal receiving circuit to filter the received communication signal to eliminate the influence of the interference communication signals.

Figure 10:
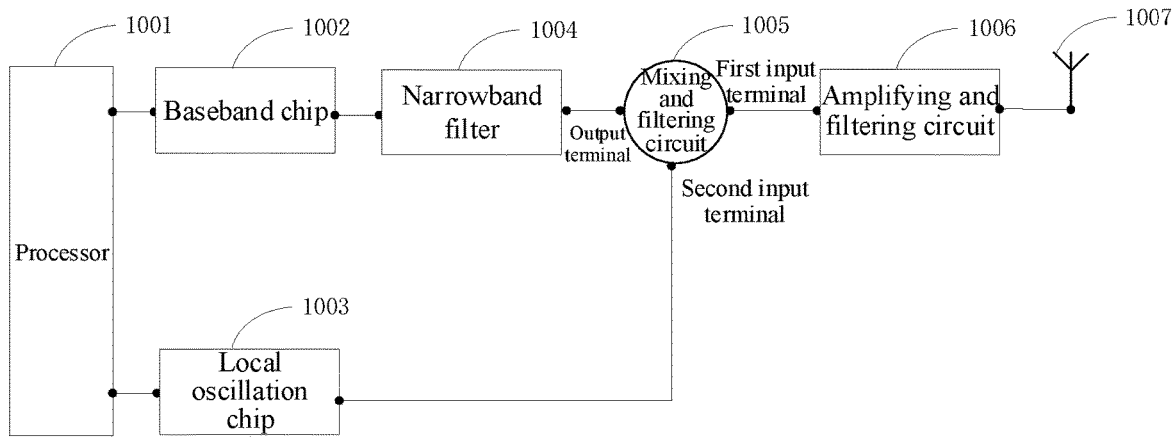
FIG. 10 is a structural diagram of a signal receiving circuit.

Referring FIG. 10, a structural embodiment of a signal receiving circuit, is shown, which includes a processor 1001, a baseband chip 1002, a local oscillation chip 1003, a narrowband filter 1004, a mixing and filtering circuit 1005, an amplifying and filtering circuit 1006 and an antenna 1007.

Wherein, the antenna 1007, the amplifying and filtering circuit 1006 and a first input terminal of the mixing and filtering circuit 1005 are electrically connected sequentially. An output terminal of the mixing and filtering circuit 1005, the narrowband filter 1004, the baseband chip 1002 and the processor 1001 are electrically connected sequentially. The processor 1001, the local oscillation chip 1002 and a second input terminal of the mixing and filtering circuit 1005 are electrically connected sequentially.

The antenna 1007 is configured to receive a communication signal. The amplifying and filtering circuit 1006 is configured to amplify and filter the communication signal which is received by the antenna.

The processor 1001 is configured to determine a current communication channel of the signal receiving circuit and control the local oscillation chip 1003 to generate a communication signal by using a local oscillation frequency point which corresponds to the current communication channel. Wherein, the local oscillation frequency point is the frequency of the communication signal which is generated by the local oscillation chip. The local oscillation chip 1003 can generate communication signals of different frequencies according to different communication channels. For example, as shown in Table 2, the local oscillation frequency points used by the local oscillation chip 1003 are different in different channels. Of course, table 2 is only an example to illustrate, and other numerical frequency points can be used in practical application.

TABLE 2

| Frequency band | Channel | Empty frequency point (MHz) | Local oscillation frequency point (MHz) | Baseband frequency point ((MHz) |
|---|---|---|---|---|
| 1395~1400 | 1 | 1395.5 | 895.5 | 500 |
|  | 2 | 1396.3 | 896.3 | 500 |
|  | 3 | 1397.1 | 897.1 | 500 |
|  | 4 | 1397.9 | 897.9 | 500 |

TABLE 2-continued

| Frequency band | Channel | Empty frequency point (MHz) | Local oscillation frequency point (MHz) | Baseband frequency point ((MHz) |
|---|---|---|---|---|
|  | 5 | 1398.7 | 898.7 | 500 |
|  | 6 | 1399.5 | 899.5 | 500 |
| 1427~1432 | 7 | 1427.5 | 927.5 | 500 |
|  | 8 | 1428.3 | 928.3 | 500 |
|  | 9 | 1429.1 | 929.1 | 500 |
|  | 10 | 1429.9 | 929.9 | 500 |
|  | 11 | 1430.7 | 930.7 | 500 |
|  | 12 | 1431.5 | 931.5 | 500 |

In one implementation, the processor 1001 can transmit the local oscillation frequency point, which corresponds to the current communication signal, to the local oscillation chip 1003. Alternatively, in another implementation, the processor 1001 may transmit the channel label of the current communication channel to the local oscillation chip 1003, and the local oscillation chip 1003 determines the local oscillation frequency point which corresponds to the channel label.

The local oscillation chip 1003 generates a communication signal by using the local oscillation frequency point which corresponds to the current communication channel and transmits the communication signal to the mixing and filtering circuit. Under different communication channels, the demodulation frequency point of baseband chip 1002 can be maintained at a fixed value, such as the 500 MHz baseband frequency point in Table 2.

Based on this signal receiving circuit, the signal receiving process is as follows. The communication signal, which is received by the antenna 1007, is amplified and filtered by the amplifying and filtering circuit 1006. Then the amplified and filtered communication signal is mixed with the communication signal, which is generated by the local oscillation chip 1003, by the mixing and filtering circuit 1005 to obtain a communication signal which is to be demodulated. The narrowband filter 1004 implements a narrowband filtering on the communication signal, which is to be demodulated, and then the baseband chip 1002 demodulates the communication signal which is to be demodulated after the narrowband filtering and transmits the demodulated communication signal to the processor 1001. The signal receiving circuit can implement the interference processing on but not limited to the communication signal of the 1.4 GHz frequency band.

It should be noted that the frequency of the communication signal which is generated by the local oscillation chip 1003 corresponds to the current communication channel. When the mixing and filtering circuit 1005 uses the communication signal to mix with the communication signal which is received by the antenna, the communication signal, which has the same demodulation frequency point as that of the baseband chip, can be obtained after mixing with the communication signal of the current communication channel. While the communication signal, which has the different demodulation frequency point from that of the baseband chip, can be obtained after mixing with a communication signal which is not the communication signal of the current communication channel.

For example, as shown in Table 2, assuming that the demodulation frequency point of the baseband chip is fixed at 500 MHz and the current communication channel of the signal receiving circuit is 1, the local oscillation chip can generate a communication signal of 895.5 MHz. The antenna receives a communication signal of 1395.5 MHz from the communication channel 1 (the empty frequency point is the frequency of the antenna for receiving the communication signal). After mixing with the communication signal of 895.5 MHz, a communication signal which is to be demodulated of 500 MHz communication signal is obtained. However, when the antenna receives a communication signal of 1396.3 MHz from the communication channel 2, a communication signal which is to be demodulated of 500.8 MHz communication signal is obtained after mixing the communication signal of 1396.3 MHz with the communication signal of 895.5 MHz.

The communication signal which is to be demodulated needs to be transmitted to the baseband chip 1002 for demodulation processing. During demodulation, the baseband chip 1002 works at a certain demodulation frequency point, which can be called as a baseband frequency point. The received communication signal which is to be demodulated has the same frequency as the baseband frequency point, so as to achieve a better demodulation effect. Therefore, a narrowband filter is arranged at the front stage of the baseband chip 1002, which can suppress the interference from the communication signals of other frequencies which are other than the baseband frequency point. For example, if the demodulation frequency point of the baseband chip is 500 MHz, the narrowband filter is a 500 MHz narrowband filter, so that the communication signal which is to be demodulated of other frequencies which are other than 500 MHz, such as 500.8 mhz, can be filtered.

Figure 11:
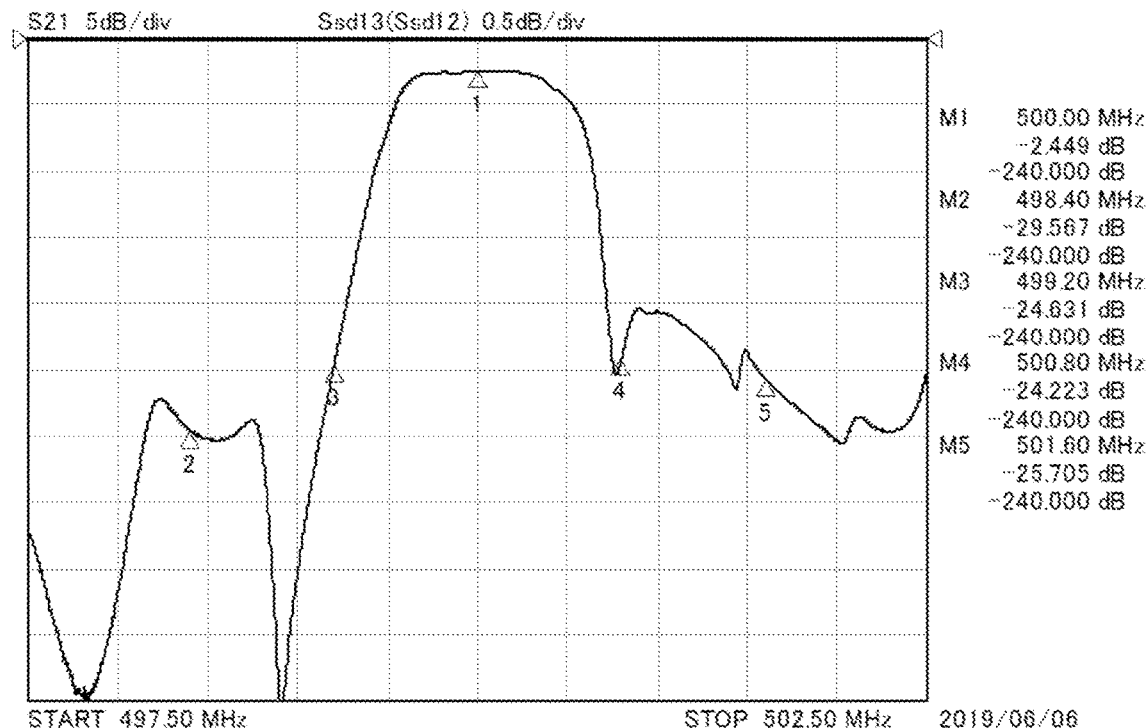
FIG. 11 is a characteristic diagram of a 500 MHz narrowband filter.

The characteristics of 500 MHz narrowband filter are shown in FIG. 11. It has a strong inhibiting effect on the communication signals of other frequency points, so as to increase the anti-interference capacity of adjacent channels.

Figure 12:
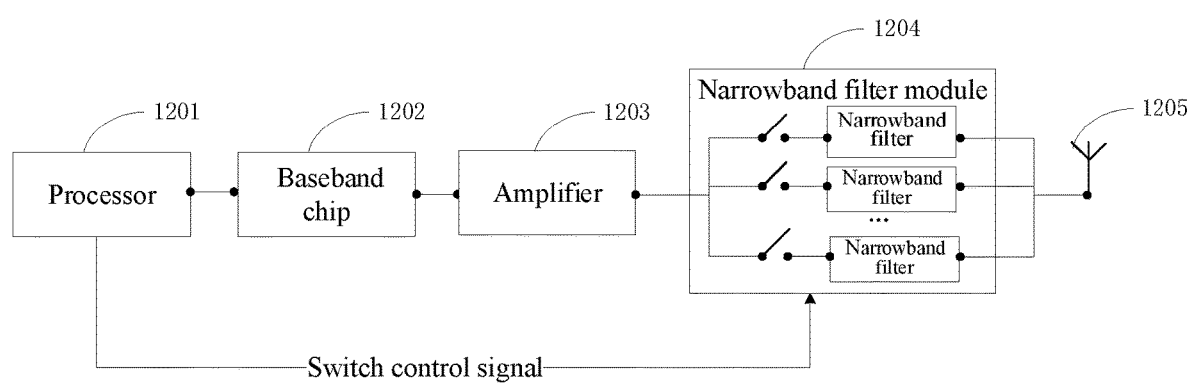
FIG. 12 is another structural diagram of a signal receiving circuit.

Referring FIG. 12, another structural embodiment of a signal receiving circuit, is shown, which specifically includes a processor 1201, a baseband chip 1202, an amplifier 1203, a narrowband filter module 1204 and an antenna 1205. It should be noted that the position relationship between the amplifier 1203 and the narrowband filter module 1204 is not limited to that shown in FIG. 12, but can also be changed in the circuit structure.

Wherein, the processor 1201, the baseband chip 1202, the amplifier 1203, the narrowband filter module 1204 and the antenna 1205 are electrically connected sequentially.

The antenna 1205 is configured to receive a communication signal.

The processor 1201 is electrically connected with the narrowband filter module 1204 and configured to determine a current communication channel of the signal receiving circuit and transmit a control instruction to the narrowband filter module 1204 to enable the narrowband filter module 1204 to filter the communication signal, which is received by the antenna 1205, by using the narrowband filter which corresponds to the current communication channel.

The narrowband filter module includes one or more narrowband filters, and different narrowband filters are configured to implement a narrowband filtering to communication signals which are received from different communication channels. Different narrowband filters can obtain communication signals of different frequencies after eliminating interference. That is, at which communication channel the signal receiving circuit works, interference signals of other frequencies, which are other than the communication channel, are eliminated.

In addition, each narrowband filter in the narrowband filter module 1204 can correspond to one switch. After determining the current communication channel of the signal receiving circuit, the processor 1201 can transmit an instruction to the narrowband filter module 1204 to indicate the switch which corresponds to the current communication channel to be closed, so as to make the narrowband filter which corresponds to the current communication channel work.

The amplifier 1203 is configured to amplify the communication signal after the narrowband filtering.

The baseband chip 1202 is configured to demodulate the amplified communication signal and transmit the demodulated communication signal to the processor 1201.

Based on this signal receiving circuit, the signal receiving process is as follows. The communication signal, which is received by the antenna 1205, is transmitted to the narrowband filter module 1204, and the processor 1201 determines the current communication channel of the signal receiving circuit and transmits a control instruction to the narrowband filter module 1204, so that the narrowband filter module 1204 uses the narrowband filter which corresponds to the current communication channel to filter the communication signal which is received by the antenna 1205. The filtered communication signal is amplified by the amplifier 1203 to obtain the communication signal which is to be demodulated. The baseband chip 1202 demodulates the communication signal which is to be demodulated and transmits the demodulated communication signal to the processor 1201. The signal receiving circuit can implement the interference processing on, but not limited to, the communication signal of the frequency band of 608 MHz.

Figure 13:
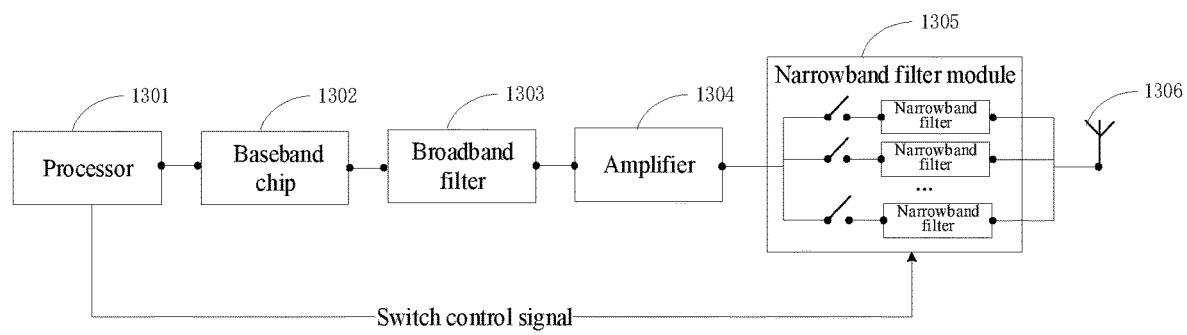
FIG. 13 is a further structural diagram of a signal receiving circuit.

Referring FIG. 13, another structural embodiment of a signal receiving circuit, is shown, which specifically includes a processor 1301, a baseband chip 1302, a broadband filter 1303, an amplifier 1304, a narrowband filter module 1305 and an antenna 1306. It should be noted that compared with the signal receiving circuit shown in FIG. 12, this signal receiving circuit adds a broadband filter 1303 to filter interference signals which belong to different frequency bands, such as 1.4 GHz frequency band, from the communication signal which is to be demodulated. The narrowband filter module 1305 is configured to filter interference signals which belong to the same frequency band but different communication channels from the communication signal which is to be demodulated. The description of other module units can refer to the description of FIG. 12 and is not repeated here.

It should be noted that the positions of the broadband filter 1303 and the narrowband filter module 1305 in this signal receiving circuit are not limited to those shown in FIG. 13, but can also be exchanged in the circuit structure. That is, the communication signal, which is received by the antenna 1306, sequentially passes through the broadband filter 1303, the amplifier 1304, the narrowband filter module 1305, the baseband chip 1302 and the processor 1301. In addition, multiple broadband filters can also be arranged. Multiple broadband filters can be used as a broadband filter module to filter interference signals in a variety of different frequency bands. Their specific arrangement structure can refer to the narrowband filter module, which is not repeated here.

Figure 14:
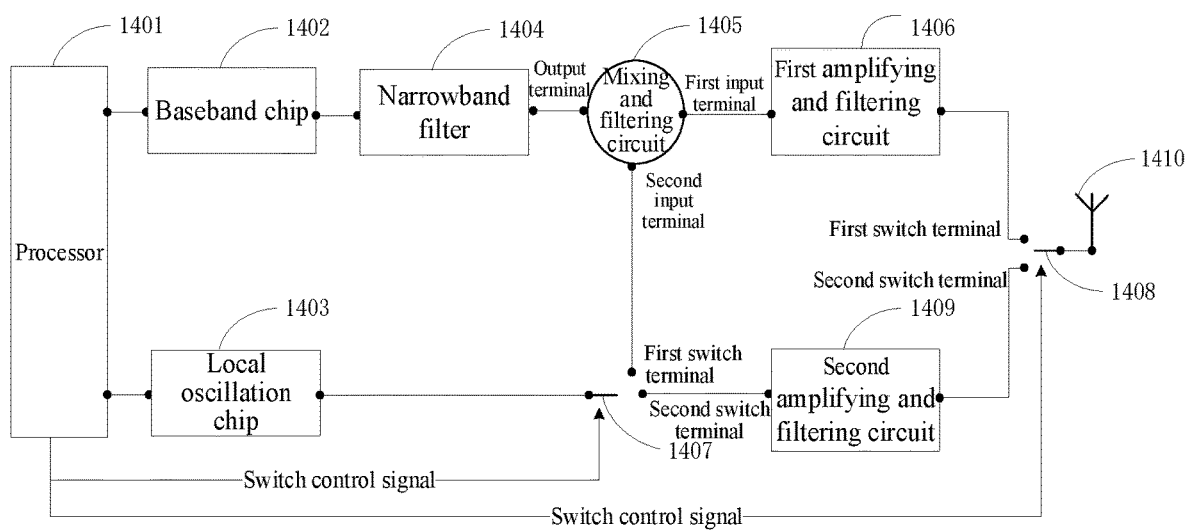
FIG. 14 is another further structural diagram of a signal receiving circuit.

Referring FIG. 14, another structural embodiment of a signal receiving circuit, is shown, which specifically includes a processor 1401, a baseband chip 1402, a local oscillation chip 1403, a narrowband filter 1404, a mixing and filtering circuit 1405, a first amplifying and filtering circuit 1406, a first switch 1407, a second switch 1408, a second amplifying and filtering circuit 1409 and an antenna 1410.

Wherein the processor 1401, the baseband chip 1402, the narrowband filter 1404 and an output terminal of the mixing and filtering circuit 1405 are electrically connected; a first input terminal of the mixing and filtering circuit 1405 and the first amplifying and filtering circuit 1406 are electrically connected sequentially; the first amplifying and filtering circuit 1406 is electrically connected with the antenna through a first switch terminal of the second switch 1408.

The processor 1401 is electrically connected with the local oscillation chip 1403.

The local oscillation chip 1403 is electrically connected with a second input terminal of the mixing and filtering circuit 1405 through a first switch terminal of the first switch 1407; the local oscillation chip 1403 is electrically connected with the second amplifying and filtering circuit 1409 through a second switch terminal of the first switch 1407.

The processor 1401 is electrically connected with the first switch 1407 and is configured to control the first switch terminal of the first switch 1407 to be connected and the second switch terminal of the first switch 1407 to be disconnected; or is configured to control the second switch terminal of the first switch 1407 to be connected and the first switch terminal of the first switch 1407 to be disconnected.

The processor 1401 is electrically connected with the second switch 1408 and is configured to control the first switch terminal of the second switch 1408 to be connected and the second switch terminal of the second switch 1408 to be disconnected; or is configured to control the second switch terminal of the second switch 1408 to be connected and the first switch terminal of the second switch 1408 to be disconnected.

Based on the above connection structure, two signal receiving circuits with different structures are realized through the control signal of the processor, which are specifically as follows.

The processor 1401 controls the first switch terminal of the first switch 1407 to be connected and the second switch terminal of the first switch 1407 to be disconnected, and the processor 1401 controls the first switch terminal of the second switch 1408 to be connected and the second switch terminal of the second switch 1408 to be disconnected, so that the antenna 1410 is electrically connected with the first amplifying and filtering circuit 1406 through the first switch terminal of the second switch 1408 to form a form of signal receiving circuit.

The processor 1401 controls the second switch terminal of the first switch 1407 to be connected and the first switch terminal of the first switch 1407 to be disconnected, and the processor 1401 controls the second switch terminal of the second switch 1408 to be connected and the first switch terminal of the second switch 1408 to be disconnected, so that the antenna 1410 is electrically connected with the second amplifying and filtering circuit 1409 through the second switch terminal of the second switch 1408 to form another form of signal receiving circuit.

It should be noted that each embodiment in this specification is described in a progressive manner. Each embodiment focuses on the differences from other embodiments. The same and similar parts of each embodiment can be referred to each other.

It should also be noted that in this disclosure, relational terms, such as first and second, are only used to distinguish one entity or operation from another entity or operation, and do not necessarily require or imply any such actual relationship or order between these entities or operations. Moreover, the terms "include", "comprise" or any other variation thereof are intended to cover non-exclusive inclusion, so that a process, method, article or device, which includes a series of components, includes not only those components, but also other components not explicitly listed, or components inherent in such process, method, article or device. Without further restrictions, the components defined by the statement "including a . . . " do not exclude the existence of other same components in the process, method, article or device including the above components.

The above description of the disclosed embodiments enables those skilled in the art to realize or use this disclosure. Various modifications to these embodiments will be apparent to those skilled in the art, and the general principles defined herein can be implemented in other embodiments without departing from the spirit or scope of this disclosure. Therefore, this disclosure is limited to these embodiments shown herein, but also includes the widest scopes which are consistent with the principles and novel features disclosed herein.

What is claimed is:

1. A portable monitoring device comprising a housing, a physiological parameter acquisition circuit, a signal transmitting circuit, and a signal receiving circuit;
   wherein the physiological parameter acquisition circuit is configured to acquire a physiological parameter of a monitored object;
   the signal transmitting circuit is configured to transmit the physiological parameter to a wireless access point through a communication signal which carries the physiological parameter and is generated by the signal transmitting circuit; wherein a current transmission power of the communication signal is determined by the signal transmitting circuit according to a current communication state of the portable monitoring device;
   the signal receiving circuit is configured to receive the communication signal which is transmitted by the wireless access point, to filter the communication signal, and to extract communication data from the communication signal; wherein the filtering filters an interference signal of another communication channel, which is other than the communication channel, which is used by the signal receiving circuit.

2. The portable monitoring device according to claim 1, wherein the signal transmitting circuit comprises a processor, a wireless chip module, an amplifying and filtering circuit, and an antenna, which are electrically connected sequentially; wherein
   the processor is configured to determine the current communication state of the portable monitoring device, which is between the antenna and the wireless access point, determine the current transmission power which corresponds to the current communication state, generate a signal generation instruction according to the current transmission power, and transmit the signal generation instruction to the wireless chip module;
   the wireless chip module is configured to control a power register to generate the communication signal of the current transmission power based on the signal generation instruction, and transmit the communication signal to the amplifying and filtering circuit;
   the amplifying and filtering circuit is configured to amplify and filter the communication signal, and transmit the processed communication signal to the antenna;
   the antenna is configured to transmit the processed communication signal to the wireless access point.

3. The portable monitoring device according to claim 2, wherein the processor is configured to determine the current transmission power which corresponds to the current communication state, according to a preset corresponding relationship between a communication state and a transmission power.

4. The portable monitoring device according to claim 1, wherein the signal transmitting circuit comprises a processor, a wireless chip module, an attenuator, an amplifying and filtering circuit, and an antenna, which are electrically connected sequentially; wherein the processor is further electrically connected with the attenuator;
the processor is configured to determine the current communication state of the portable monitoring device, which is between the antenna and the wireless access point, determine a current adjustment power which corresponds to the current communication state, generate a power adjustment instruction according to the current adjustment power, and transmit the power adjustment instruction to the attenuator;
the wireless chip module is configured to generate a first communication signal of a preset transmission power and transmit the first communication signal of the preset transmission power to the attenuator;
the attenuator is configured to adjust a transmission power of the first communication signal according to the current adjustment power, based on the power adjustment instruction, and transmit the adjusted communication signal to the amplifying and filtering circuit;
the amplifying and filtering circuit is configured to amplify and filter the adjusted communication signal and transmit the amplified and filtered communication signal to the antenna;
the antenna is configured to transmit the amplified and filtered communication signal to the wireless access point;
wherein the adjusted communication signal is the communication signal of the current transmission power.

5. The portable monitoring device according to claim 4, wherein the wireless chip module comprises a baseband chip, a local oscillation chip, and a mixing and filtering circuit; wherein the baseband chip is electrically connected with the processor and a first input terminal of the mixing and filtering circuit, respectively; the local oscillation chip is electrically connected with the processor and a second input terminal of the mixing and filtering circuit, respectively; an output terminal of the mixing and filtering circuit is electrically connected with the attenuator.

6. The portable monitoring device according to claim 4, wherein the processor is configured to determine the current adjustment power which corresponds to the current communication state, according to a preset corresponding relationship between a communication state and an adjustment power.

7. The portable monitoring device according to claim 1, wherein the signal transmitting circuit comprises a processor, a wireless chip module, an attenuator, an amplifying and filtering circuit, and an antenna, which are electrically connected sequentially; wherein the processor is further electrically connected with the attenuator;
the processor is configured to determine the current communication state of the portable monitoring device, which is between the antenna and the wireless access point, determine a first current transmission power and a current adjustment power, which correspond to the current communication state, generate a signal generation instruction according to the first current transmission power and transmit the signal generation instruction to the wireless chip module, and generate a power adjustment instruction according to the current adjustment power and transmit the power adjustment instruction to the attenuator;
the wireless chip module is configured to control a power register to generate a communication signal of the first current transmission power based on the signal generation instruction, and transmit the communication signal of the first current transmission power to the attenuator;
the attenuator is configured to adjust a transmission power of the communication signal according to the current adjustment power, based on the power adjustment instruction, and transmit the adjusted communication signal to the amplifying and filtering circuit;
the amplifying and filtering circuit is configured to amplify and filter the adjusted communication signal and transmit the amplified and filtered communication signal to the antenna;
the antenna is configured to transmit the amplified and filtered communication signal to the wireless access point;
wherein the adjusted communication signal is the communication signal of the current transmission power.

8. The portable monitoring device according to claim 7, wherein the processor is configured to determine the first current transmission power and the current adjustment power which correspond to the current communication state, according to a preset corresponding relationship among a communication state, the transmission power, and an adjustment power.

9. A portable monitoring device comprising: a housing, a physiological parameter acquisition circuit; a signal transmitting circuit; and a signal receiving circuit, wherein the signal transmitting circuit comprises a processor, a wireless chip module, an amplifying and filtering circuit, and an antenna, which are electrically connected sequentially,
wherein the wireless chip module comprises a baseband chip, a local oscillation chip, and a mixing and filtering circuit; wherein the baseband chip is electrically connected with the processor and a first input terminal of the mixing and filtering circuit, respectively; the local oscillation chip is electrically connected with the processor and a second input terminal of the mixing and filtering circuit, respectively; an output terminal of the mixing and filtering circuit is electrically connected with the amplifying and filtering circuit;
wherein the processor is configured to determine a current communication state between the antenna and the wireless access point, determine a current transmission power which corresponds to the current communication state, generate a first signal generation instruction according to the current transmission power, and transmit the first signal generation instruction to the baseband chip; and
the baseband chip is configured to control a power register thereof to generate a communication signal of a first transmission power based on the first signal generation instruction, the local oscillation chip is configured to generate a carrier signal of a preset transmission power, and the mixing and filtering circuit is configured to mix the communication signal of the first transmission power and the carrier signal of the preset transmission power to obtain a communication signal of the current transmission power,
wherein the physiological parameter acquisition circuit is configured to acquire a physiological parameter of a monitored object;

the signal transmitting circuit is configured to transmit the physiological parameter to a wireless access point through the communication signal of the current transmission power;

wherein the communication signal of the current transmission power carries the physiological parameter; and the signal receiving circuit is configured to receive a communication signal which is transmitted by the wireless access point.

10. A portable monitoring device comprising: a housing; a physiological parameter acquisition circuit; a signal transmitting circuit; and a signal receiving circuit, wherein the physiological parameter acquisition circuit is configured to acquire a physiological parameter of a monitored object;

the signal transmitting circuit is configured to transmit the physiological parameter to a wireless access point through a communication signal which carries the physiological parameter; and the signal receiving circuit is configured to receive a communication signal which is transmitted by the wireless access point, wherein the signal receiving circuit comprises a processor, a baseband chip, a local oscillation chip, a narrowband filter, a mixing and filtering circuit, an amplifying and filtering circuit, and an antenna, wherein the antenna, the amplifying and filtering circuit and a first input terminal of the mixing and filtering circuit are electrically connected sequentially;

an output terminal of the mixing and filtering circuit, the narrowband filter, the baseband chip and the processor are electrically connected sequentially;

the processor, the local oscillation chip and a second input terminal of the mixing and filtering circuit are electrically connected sequentially; and the antenna is configured to receive the communication signal which is transmitted by the wireless access point; the amplifying and filtering circuit is configured to amplify and filter the communication signal which is received by the antenna; the processor is configured to determine a current communication channel of the signal receiving circuit and control the local oscillation chip to generate a communication signal by using a frequency point, which corresponds to the current communication channel; the mixing and filtering circuit is configured to mix the amplified and filtered communication signal with the communication signal, which is generated by the local oscillation chip, to obtain a communication signal which is to be demodulated; the narrowband filter is configured to implement a narrowband filtering to the communication signal which is to be demodulated; the baseband chip is configured to, after the narrowband filtering, demodulate the communication signal which is to be demodulated, and to transmit the demodulated communication signal to the processor; the processor is configured to extract the communication data from the communication signal.

* * * * *